UNITED STATES PATENT OFFICE.

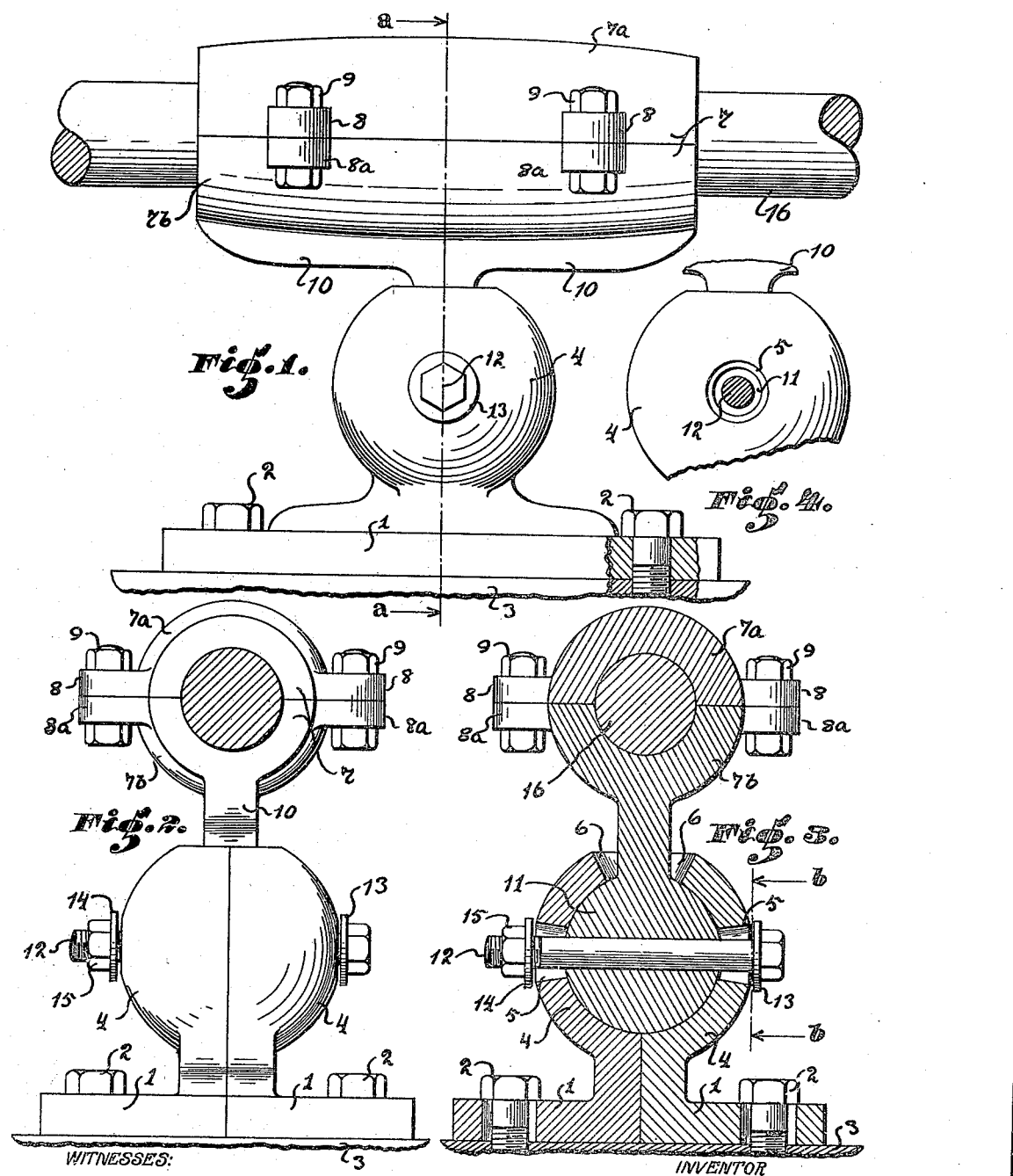

EUSTICE E. DICKERSON, OF CLEBURNE, TEXAS.

BEARING.

1,194,604.

Specification of Letters Patent.

Patented Aug. 15, 1916.

Application filed January 23, 1915, Serial No. 4,008. Renewed April 17, 1916. Serial No. 91,748.

*To all whom it may concern:*

Be it known that I, EUSTICE E. DICKERSON, a citizen of the United States, residing at Cleburne, in the county of Johnson and State of Texas, have invented certain new and useful Improvements in Bearings, of which the following is a specification.

My invention has relation to an adjustable bearing for shafting and the like and in such connection it relates more particularly to the arrangement and construction of the bearing block and of the hanger wherein the said block is supported.

The principal objects of my present invention are to provide a bearing for shafting or the like of simple construction and so arranged that variations in position of the supported shaft whether caused by wear upon the bearing or inaccurate alinement of the shaft with respect to the hangers may be readily compensated for by adjusting the bearing block in the hanger; and second to provide in an adjustable bearing a bearing block having an arm carrying a spherical enlargement, and a hanger adapted to receive and inclose said spherical enlargement and to permit the same to turn therein in a horizontal plane and in a plane at right angles to said horizontal plane.

The nature and scope of my invention will be more fully understood from the following description taken in connection with the accompanying drawings, forming part hereof, in which—

Figure 1 is a side view of an adjustable bearing embodying main features of my invention. Fig. 2 is an end elevational view of the same. Fig. 3 is a cross sectional view taken on line $a$—$a$ of Fig. 1, and Fig. 4 is a sectional view taken on line $b$—$b$ of Fig. 3.

Referring to the drawings 1—1 represent the two halves of the hanger—divided vertically and each half secured by bolts 2 or otherwise at its base to the floor or ceiling 3. The body of each half is cup shaped as at 4 so that when the two halves are bolted in required position the body 4 is substantially a hollow sphere. The wall of each half of body 4 is provided with an inwardly tapering circular hole or opening 5, and each half has at its upper end an inwardly tapering semicircular opening 6 which when the halves are united forms a circular hole or opening inwardly tapered or frusto-conical.

The bearing block 7 is divided horizontally into two parts of which the upper $7^a$ is substantially semi tubular and has the projecting ears or lugs 8 to receive the fastening bolts 9. The lower section $7^b$ of block 7 has the ears or lugs $8^a$ registering with lugs 8 and on its under surface a longitudinally arranged fin or web 10. This fin or web 10 terminates at a point approximately intermediate of its ends in a ball shaped enlargement or member 11 adapted to fit snugly (see Fig. 3) in the hollow spherical body 4 of the hanger, with its web 10 projecting loosely through the opening 6 therein.

The spherical enlargement or member 11 is held to required position in the socket member 4 of the hanger by means of a bolt 12 traversing the member 11 diametrically in a plane parallel with the plane of division of the two members of the bearing block 7. The head and end of the bolt 12 each project beyond the socket member 4 and the projecting portions play loosely in the frusto-conical openings 5. The bolt 12 however fits snugly in the diametrical opening in the member 11 through which it passes. The head of the bolt 12 bears against a washer 13 sufficiently large to cover one side opening 5 of member 4, and a washer 14 on the other end of said bolt is adapted when the nut 15 is advanced on the bolt to clamp down upon the outside of the member 4 over the other side opening 4. The bearing block 7 is designed to receive and support a shaft 16 or other rotating axle.

In the operation of the device if for any reason the shaft 16 revolves eccentrically in the bearing block 7 or if said shaft should be hung in a position not necessarily parallel with the floor, wall or ceiling from which it is supported through bearing block 7 and hanger 1, a ready adjustment of the shaft and bearing block to the hanger may be secured by unloosening the nut 15 on bolt 12 and turning the bearing block through its spherical connection 11 in the socket member 4 of the hanger to a required angle either horizontally or vertically at right angles thereto until the adjustment is made. Upon the tightening thereafter of nut 15 on bolt 12 the bearing block 7 is locked in required position.

In the initial installment of the bearing, the bolt and nut are first tightened to connect the ball shaped member 11 to both of the socket members 4. These members 4 are then bolted or otherwise secured to the floor, wall or ceiling and when once firmly bolted to position the bolt 12 may be entirely removed from the device and the bearing will thereafter be automatically or self adjusting.

Having thus described the nature and objects of my invention what I claim as new and desire to secure by Letters Patent, is—

An adjustable bearing comprising a two part bearing block and a two part hanger, one part of the bearing block being provided with a web and a spherical enlargement at the end of said web, and the hanger having a hollow spherical body adapted to receive and snugly fit the spherical enlargement, an opening in the hollow body of the hanger in which opening the web of the bearing block loosely plays, and openings diametrically opposite to each other and formed in the walls of the hollow body at right angles to the opening for said web, in combination with a locking bolt loosely traversing the diametrically opposite openings of the hollow body of the hanger and snugly traversing diametrically the spherical enlargement of the bearing block, substantially as described.

In testimony whereof I have signed my name to this specification in the presence of two subscribing witnesses.

EUSTICE E. DICKERSON.

Witnesses:
G. C. WALDROP,
G. SCHUMM.

Copies of this patent may be obtained for five cents each, by addressing the "Commissioner of Patents, Washington, D. C."